United States Patent [19]

Akiyama et al.

[11] Patent Number: 5,056,897
[45] Date of Patent: Oct. 15, 1991

[54] SPATIAL LIGHT MODULATING ELEMENT AND NEURAL NETWORK CIRCUIT

[75] Inventors: Koji Akiyama, Neyagawa; Hiroshi Tsutsu, Osaka; Tetsu Ogawa, Kyoto; Hiroshi Tsutsui, Yawata, all of Japan

[73] Assignee: Matsushita Electric Industrial Co., Ltd., Osaka, Japan

[21] Appl. No.: 440,325

[22] Filed: Nov. 22, 1989

[30] Foreign Application Priority Data

Nov. 25, 1988 [JP] Japan .................................. 63-298701

[51] Int. Cl.⁵ ................................................ G02F 1/13
[52] U.S. Cl. ........................................ 359/72; 359/104
[58] Field of Search ............... 350/332, 333, 334, 342, 350/350 S; 360/784

[56] References Cited

U.S. PATENT DOCUMENTS

| | | | |
|---|---|---|---|
| 4,198,647 | 4/1980 | Grinberg et al. | 350/332 |
| 4,277,145 | 7/1981 | Hareng et al. | 350/351 |
| 4,679,910 | 7/1987 | Efron et al. | 350/335 |
| 4,941,735 | 7/1990 | Moddel et al. | 350/342 |
| 4,943,143 | 7/1990 | Yamashita | 350/333 |

Primary Examiner—Rolf Hille
Assistant Examiner—Tan Ho
Attorney, Agent, or Firm—Stevens, Davis, Miller & Mosher

[57] ABSTRACT

A spatial light modulator and a neural network circuit are disclosed. The modulator is used in pattern recognition and has an arrangement in which a photoconductive layer held between conductive electrodes is connected in series to a liquid crystal cell including a liquid crystal layer held between two opposite electrodes. Setting the rate between the area of the photoconductive layer and the area of at least one of the opposite electrodes between which the liquid crystal layer is disposed, provides a highly efficient reflective and transmissive spatial light modulator of a simple structure. Both reflective and transmissive spatial light modulating elements are applied to a neurocomputer or the like.

7 Claims, 13 Drawing Sheets

FIG. IA
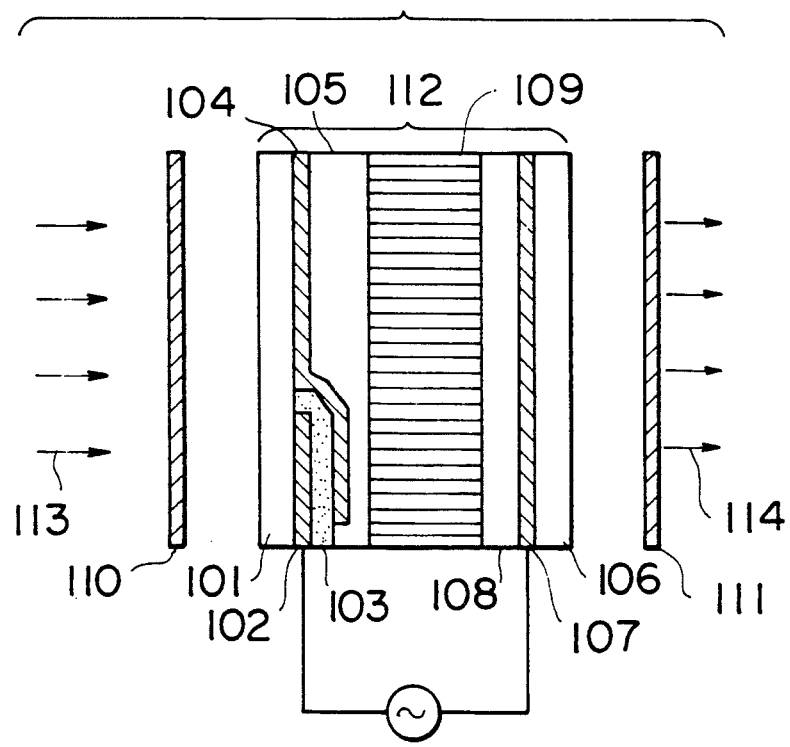
FIG. IB
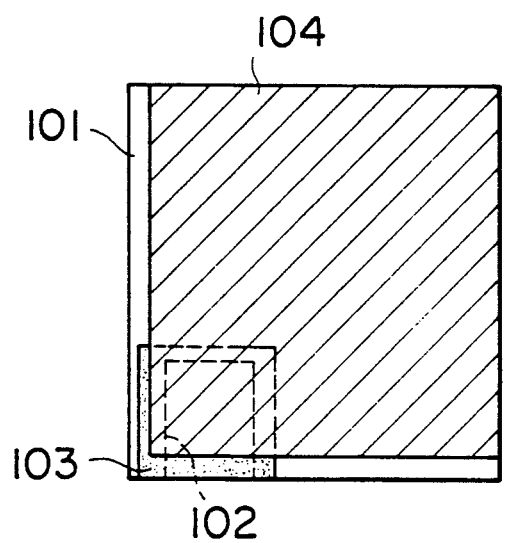

WAVE LENGTH ($\lambda_1 < \lambda_2$)

SPATIAL LIGHT MODULATING ELEMENT AND NEURAL NETWORK CIRCUIT

BACKGROUND OF THE INVENTION

1. Field of the Invention

The present invention relates to a spatial light modulator used in an optical computing device and a projection type display and also to a neural network circuit executing input/output operations similar to those of nervous system, e.g., pattern recognition, associative memory and/or parallel computation.

2. Description of the Related Art

The spatial light modulator is an important element for achieving an optical operation, e.g., optical logical operation or optical neurocomputing. In addition, the parallelism of light matches a neural network executing operations, with the use of parallel dynamics. Thus, various arrangements for optical neurocomputing have been provided. In particular, as an arrangement realizing a hierarchical neural network circuit in the form of hardware having a learning function, Ishikawa et al have proposed an optical system employing a reflective spatial light modulator (i.e., microchannel modulator) (Masatoshi Ishikawa et al., Applied Optics, 28 (2), 1989, pages 291–301).

In addition, one of important roles of neurocomputing is a nonlinear input/output characteristic operation or a threshold operation. Therefore, a transmissive spatial light modulator executing such operation is also required for materializing the neural network into a practical hardware form. However, there has been known no actual optical neurocomputer employing a transmissive spatial light modulator having the function of executing the threshold operation. Currently, the threshold operation of a reported optical neurocomputer depends on an electronic circuit or electronic computer.

An optically writing type spatial light modulator with liquid crystal (hereinafter, referred to as LC-SLM) has a lower speed of response while it can be driven at a low voltage, has a high contrast and can display a half tone. Various types thereof have been already proposed. However, a fundamental arrangement of the optically writing type spatial light modulator has the form of laminated photoconductive layers and a liquid crystal layer. Almost all of optically writing type spatial light modulators have been of a reflective type but not transmissive type.

As a transmissive type LC-SLM, having such a threshold characteristic of a spatial light modulator 1003 as shown in FIG. 10, in which a photoconductive layer 1001 made of $Bi_{12}SiO_{20}$ (hereinafter, referred to as BSO) or $Bi_{12}GeO_{20}$ and a liquid crystal layer 1002 are laminated, has been proposed (Kuniji Takizawa et al, Preliminary Lecture Brief of The 50th Applied Physics Society Scientific Lecture Meeting, Autumn in 1989, 28p-ZD-6, 30p-ZD-7 and 28p-ZD-8).

In accordance with the lamination type spatial light modulator with the liquid crystal as shown in FIG. 10, a dark electric impedence of the photoconductive layer upon energization must be greater than an electric impedance of the liquid crystal layer so that a voltage applied to the liquid crystal is not much higher when light is shut off. However, the liquid crystal has a low capacitance and a great resistivity because it is an organic matter. Therefore, the electric impedance of the liquid crystal is generally high. Thus, the thickness of the photoconductive layer must be correspondingly increased so as to decrease the capacitance of the photoconductive layer and to increase the electric resistance thereof. Consequently, the thickness of a photoconductive layer made of a photoconductive material, e.g., CdS, CdSe or a-Si:H which are generally used is inevitably increased, resulting in insufficient light transmission through the photoconductive layer. Because of this fact, almost all of the optically-writing type spatial light modulators using liquid crystal have been of the reflective type.

The optically-writing type transmissive spatial light modulator is more preferable than the optically-writing type reflective spatial light modulator because the former requires only a single light source so as to have a more simplified optical system. In particular, one of the important problems is how to simply form a hierarchical network configuration for execution of neurocomputing. Although the example proposed by Ishikawa et al has a network with a simplified two-layer structure, an optical system of this network is very complicated. This is because that this optical system employed a microchannel spatial light modulator of a reflective type. Since the hierarchical structure of the hierarchical neural network having at least three layers is required for realizing a practical function, the neural network must comprise a transmissive spatial light modulator. Otherwise, the hardware of the neural network would be too complicated to realize the neural network.

In addition, one of fundamental operations of the neural network takes the total value of multiple inputs and subjects the total value to a threshold operation. The thresholds must be controlled in order to accelerate convergence of learning and to improve operation in an ambiguous or fuzzy process. However, an optical neurocomputer of which the neural network is in the form of hardware is currently executing the threshold operation by means of an electronic circuit or electronic computer because no spatial light modulators having such a control function are present. Consequently, executing the threshold operation entails a photoelectric conversion so that the formation of the hierachical network is very difficult.

The prior-art example of FIG. 10 has realized a transmissive spatial light modulator including the photoconductive layer 1001 made of BSO essentially transparent to visible radiation having a threshold function. However, the prior-art example of FIG. 10 lacks the function of threshold operation by collecting several inputs given by the fundamental operations of the neural network so as to execute the threshold operation. In addition, since the specific dielectric constant of BSO is about 20 times as high as that of a liquid crystal, the thickness of a BSO layer becomes thick as 2 mm. A writing-light intensity for driving a liquid crystal is higher then 1 $mW/cm^2$, and the operating voltage of the transmissive spatial light modulator of FIG. 10 must be increased to 10 V or higher.

SUMMARY OF THE INVENTION

A primary aspect of the present invention is to solve the prior-art problems as described above. Accordingly an object of the primary aspect of the present invention is to provide a spatial light modulator having a reduced loss in intensity of a transmitted light from the transmissive spatial light modulator so as to operate in response to even very low signal light, and having the function of executing a threshold operation, thereby providing a hierarchical neural network.

An object of a secondary aspect of the present invention is to provide a hierarchical neural network having a learning function and realizing a threshold operation executing function by means of a simple optical system.

In order to achieve the objects, the spatial light modulator according to the primary aspect of the present invention comprises: a liquid crystal cell including a liquid crystal layer held between two opposite conductive electrodes having different areas; and a photoconductive layer held between conductive electrodes and connected in series to said liquid crystal cell, the area of said photoconductive layer being less than 50% of the area of smaller on of the opposite conductive electrodes between which the liquid crystal layer is disposed.

The hierarchical neural network circuit of the secondary aspect of the present invention comprises: a light emitting element; and a plurality of spatial light modulators connected together in parallel and each including a liquid crystal cell having a liquid crystal layer held between two opposite conductive electrodes of different areas, and a photoconductive layer held between conductive electrodes and connected in series to said liquid crystal cell, the area of the photoconductive layer being less than 50% of the area of smaller one of the conductive electrodes between which the liquid crystal layer is held.

In the arrangement in which the photoconductive layer held between the conductive electrodes and the liquid crystal cell including the liquid crystal layer held between the opposite conductive electrodes are connected together in series, even thought the thickness of the photoconductive layer is reduced the capacitance of the photoconductive layer can be reduced to a value equal to or below that of the liquid crystal cell by decreasing the area of the photoconductive layer. Thus, the thickness of the photoconductive layer is reduced and the area of the photoconductive layer occupying the area of the liquid crystal cell is reduced so that the proportion at which the photoconductive layer even in a transmissive spatial light modulator absorbs incident light is very low. In addition, since the thickness of the photoconductive layer is reduced, incident light of even a very low intensity can generate and transfer optical pumping carriers throughout the photoconductive layer, and reduce the operating voltage of the spatial light modulating element. Thus, the intensity of light emission from a light source can be reduced so that the freedom in selection of the light source can be increased.

When the above spatial light modulator is used to realize a threshold operation executing function of a previous cell, the voltage applied to the spatial light modulator can change the intensity of incident light with which a voltage applied to the liquid crystal layer starts increasing so as to freely set a threshold. Thus, controlling the threshold can efficiently converge the learning of the neural network and improve the function of executing an operation for ambiguous or fuzzy information. Further, with the use of a plurality of photoconductive layers which are connected together in series and which are electrically connected to the liquid crystal layer, there is provided the function of producing the total of quantities of incident light impinging on these photoconductive layers and subjecting the total of the quantities of incident light to the threshold operation. In addition, a parallel arrangement of these spatial light modulators can execute threshold operations in parallel, resulting in a speed of the operation faster than that of the operation mode by a neurocomputer including the electronic computer. Furthermore, with the use of a simple matrix type or active matrix type liquid crystal display (i.e., LCD) driven by a usual transmissive spatial light modulator for a synaptic pattern of a neural network, if the transmissive spatial light modulator executes a threshold operation, simple alternate superposition of the LCDs and the spatial light modulators can easily realize a hierarchical neural network.

BRIEF DESCRIPTION OF THE DRAWINGS

The embodiments of the present invention will be described with reference to the drawings, in which:

FIG. 1a is a sectional view illustrating one embodiment of a transmissive spatial light modulator according to the present invention;

FIG. 1b is a plan view illustrating a part of the transmissive spatial light modulator shown in FIG. 1a;

FIG. 1c is a view illustrating a circuit diagram of the transmissive spatial light modulator shown in FIG. 1a;

FIG. 3b is a plan view of the transmissive spatial light modulator shown in FIG. 3a;

FIG. 5b is a plan view illustrating a part of the reflective spatial light modulator shown in FIG. 5a;

FIG. 7c is a view illustrating patterns stored in the neural network circuit shown in FIG. 7a;

FIG. 9b is a view illustrating a part of a transmissive spatial light modulator array of the hierachical neural network shown in FIG. 9a;

FIG. 9c is a graph illustrating the transmission characteristic of a colour polarizer in the hierarchical neural network of FIG. 9a;

FIG. 9d is a view illustrating a part of a reflective spatial right modulator array of the hierarchical neural network shown in FIG. 9a.

DETAILED DESCRIPTION OF THE PREFERRED EMBODIMENTS

Hereinafter, preferred embodiments of the present invention will be described in detail with reference to the drawings.

Figure 1C:
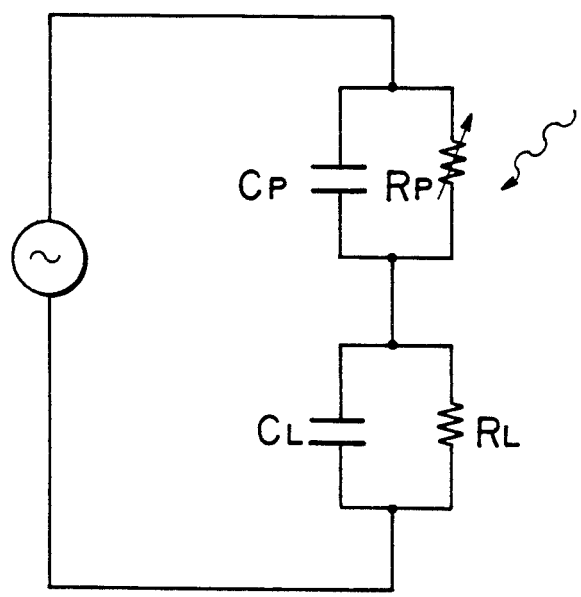

FIGS. 1a to 1c illustrate one embodiment of a transmissive spatial light modulator of the first aspect of the present invention. FIG. 1a is a sectional view illustrating a transmission spatial light modulator according to the first aspect of the present invention. FIG. 1b is a plan view of a photoconductive layer provided on one transparent insulating substrate. FIG. 1c is an equivalent circuit diagram of the transmissive spatial light modulator shown in FIG. 1a.

The transmissive spatial light modulator comprises a transparent insulating substrate 101 (made, e.g., of a glass plate), a transparent conductive electrode pattern 102 (made, e.g., of ITO or $SnO_x$) provided on the transparent insulating substrate 101, and a photoconductive layer 103 provided on the transparent conductive electrode pattern 102. A transparent conductive electrode pattern 104 provided on the photoconductive layer 103 is laminated thereover with a rubbed orientation film 105 (made, e.g., of polyimide, polyvinyl alcohol or $SiO_x$). A liquid crystal layer 109 (e.g. of a nematic type) is held between the thus formed element and an element including a transparent insulating substrate 106 (made, e.g., of a glass plate), a transparent conductive electrode pattern 107 provided on the transparent insulating substrate 106 and a rubbed orientation film 108 provided on the conductive electrode pattern 107 so as to provide a transmissive spatial light modulator 112 having a polarizer 110 and an analyzer 111 on both sides thereof. As shown in FIG. 1c, an equivalent circuit of the transmissive spatial light modulator 112 is expressed by the capacitance $C_P$ of the photoconductive layer 103 and the capacitance $C_L$ of the liquid crystal layer 109 which are connected in series before the transmissive spatial light modulator 112 is illuminated.

A material which operates as a dielectric upon no light irradiation and on the other hand, which loses a dielectric property upon light irradiation because of its photoconductivity should be selected for the photoconductive layer 103. For example there may be use of compound semiconductors such as CdS, CdTe, CdSe, ZnS, ZnSe, GaAs, GaN, GaP, GaAlAs InP and the like; amorphous semiconductors such as Se, SeTe AsSe and the like polycrystalline or amorphous semiconductors such as, Si, Ge, $Si_{1-x}C_x$, $Si_{1-x}Ge_x$ or $Ge_{1-x}C_x$ ($0<x<1$); and organic semiconductors of (1) phthalocyanine pigments (hereinafter, referred to as Pc) such as nonmetallic Pc XPc(X=Cu, Ni, Co, TiO, Mg and Si-(OH)$_2$), AlClPcCl, TiOClPcCl, InClPcCl, InClPc and InBrPcBr, (2) azo-system pigments, such as a monoazo pigment, a disazo pigment and the like, (3) perylene-group pigments such as perylene acid anhydride and perylene acid imide, (4) indigoid dye, (5) quinacridon pigment, (6) polycyclic quinones such as anthraquinones pyrenequinones and the like (7) cyanine pigment, (8) xanthene dye, (9) charge-transfer complex such as PVK/TNF and the like, (10) eutectic complex comprising pyrylium salt dye and polycarbonate resin, and (11) azulenum chloride.

In addition, when the photoconductive layer 103 is made of amorphous Si, Ge, $Si_{1-x}C_x$, $Si_{1-x}Ge_x$ or $Ge_{1-x}C_x$ (hereinafter, referred to as a-Si, a-Ge, a-$Si_{1-x}C_x$, a-$Si_{1-x}Ge_x$ or a-$Ge_{1-x}C_x$), the photoconductive layer 103 may include hydrogen or halogen. The photoconductive layer 103 may include oxygen or nitrogen in order to reduce its relative permittivity or to increase its electric resistivity. The photoconductive layer 103 may include an element constituting of p-type impurity such as B, Al, Ga or the like, or an element constituting n-type impurity P, As, Sb or the like in order to control the electric resistivity of the photoconductive layer 103. The lamination of layers made of the amorphous materials added with such impurities may provide junction of p/n, p/i, i/n, p/i/n or the like so as to produce a depletion layer in the photoconductive layer 103, in order to control the relative permittivity, dark resistance and the operating voltage polarity of the photoconductive layer 103.

Alternatively, the lamination of at least two layers made of the above materials other than the amorphous materials may provide a heterojunction so as to produce a depletion layer in the photoconductive layer 103.

The thickness of the photoconductive layer 103 is preferably 0.01 μm to 100 μm. The area of the photoconductive layer 103 is preferably less than 50% of the area of smaller one of the transparent conductive electrode patterns 104 and 107 so as to avoid decreasing the intensity of transmitted light from the transmissive spatial light modulator 112 because light passes mainly through an area of the transmissive spatial light modulator 112 where no photoconductive layer 103 is present.

The orientation films 105 and 108 are set so as to twist the orientation of liquid crystal molecules through 90 degrees in parallel to the stratum direction while the polarization directions of the polarizer 110 and the analyzer 111 are parallel. The polarizer 110 and analyzer 111 may be made of polarization films adhered to the transparent insulating substrates 101 and 106.

A liquid crystal for the liquid layer 109 is preferably a nematic liquid crystal but may be formed of ferroelectric chiral smectic-C liquid crystal. The use of the chiral smectic-C liquid crystal can reduce the thickness of the liquid crystal layer 109, increase the capacitance thereof and also enable the liquid crystal layer 109 to have a high speed response and to have a memory function so that the use of the chiral smectic-C liquid crystal is more effective.

The operation of the transmissive spatial light modulator 112 will be described with reference to the FIG. 1a which is a sectional view and FIG. 1c which shows an equivalent circuit diagram. Before light irradiation an AC voltage V is applied to the capacitance $C_P$ and electric resistance $R_P$ of the photoconductive layer 103 and to the capacitance $C_L$ and electric resistance $R_L$ of the liquid crystal layer 109. In this state, the AC voltage V is applied mainly to the capacitance $C_P$ and electrical resistance $R_P$ of the photoconductive layer 103, rather than the capacitance $C_L$ and electrical resistance $R_L$. Upon light irradiation, the electric resistance $R_P$ of the photoconductive layer 103 decreases so that the AC voltage V is now applied mainly to the capacitance $C_L$ and electric resistance $R_L$ of the liquid crystal layer 109. Thus, the orientation of the liquid molecules of the liquid crystal 109 varies, so that incident light 113 passes through the analyzer 111 to provide an output light 114. Thus, the output light intensity of the transmissive spatial light modulator 112 depends on the incident light intensity thereof so that the transmissive spatial light modulator 112 operates as an optically writing type modulator.

On the other hand, since an incident light intensity higher than a fixed value is required to causes the transmissive spatial light modulator 112 to produce output light, the transmissive spatial light modulator 112 also operates as a threshold element. The threshold of the transmissive light modulator 112 can vary in dependence upon the AC voltage V.

Figure 2:
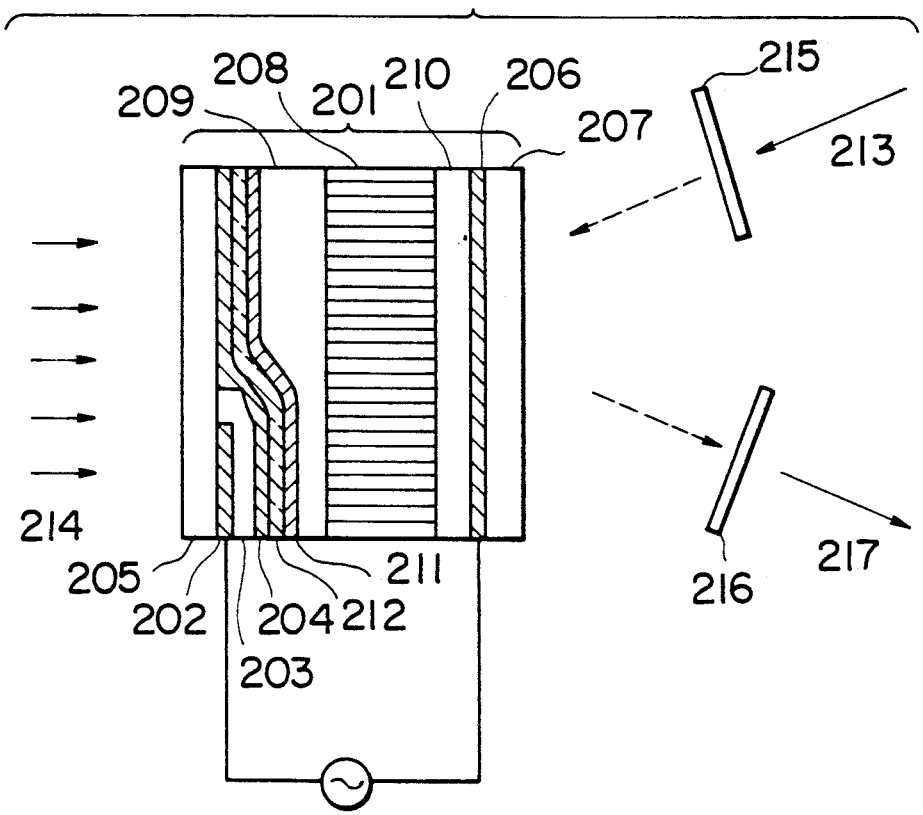
FIG. 2 is a sectional view illustrating one embodiment of a reflective spatial light modulator according to the present invention.

FIG. 2 is a sectional view illustrating one embodiment of a reflective spatial light modulator 201 according to the first aspect of the present invention. Similar to the transmission type shown in FIG. 1a, even in this reflective spatial light modulator 201, a liquid crystal layer 208 is held between a photoconductive layer 203 formed on a transparent conductive electrode pattern 202 together with a transparent insulating substrate 205 formed thereon with a conductive electrode pattern 204, and a transparent insulating substrate 207 formed thereon with a transparent conductive electrode pattern 206. Difference of the reflective spatial light modulator 201 shown in FIG. 2 from the transmissive spatial light modulator 112 is such that orientation films 209 and 210 twist the orientation of the liquid crystal molecules of the liquid crystal layer 208 to an angle of 45 degrees in parallel with the stratum direction, and that the reflective spatial light modulator 201 has a light reflection layer 211 and a light absorption layer 212 between the orientation layer 209 and the conductive electrode pattern 204. The light reflection layer 211 reflects a reading light 213 and may be formed of a dielectric mirror having multiple layers of dielectric or made of a thin layer of a metal such as Al, Cr, Ni, Mo or the like. In the latter case, an insulating layer must be provided between the thin metal layer and the conductive electrode pattern 204 in order to prevent a short circuit therebetween. On the other hand, the light absorption layer 212 prevents reflection of a signal light 214 in order to improve the resolution of the reflective spatial light modulating element 201 and is made of a material having a forbidden gap band width sufficiently smaller than that the photoconductive layer 203. The polarization directions of a polarizer 215 and an analyzer 216 are orthogonal to each other.

The operation of the reflective spatial light modulator 201 will be described hereinafter. An AC voltage V is continuously applied between the transparent conductive electrode patterns 202 and 206. When the signal light 214 is not yet irradiated or has a low intensity, the AC voltage V is applied mainly to the photoconductive layer 203 so that the orientation of the liquid crystal molecules is almost unchanged. Thus, the reading light which has been linearly polarized by the polarizer 215 is directly picked up as a reflected light, and accordingly will not pass through the analyzer 216. On the other hand, when the intensity of the signal light 214 is sufficiently high, the AC voltage V is applied mainly to the liquid crystal layer 208 so that the orientation of the liquid crystal molecules of the liquid crystal layer 208 is not parallel with the stratum direction. Thus, the reflected light of the reading light which has been linearly polarized by the polarizer 215 is turned into elliptically polarized light. The reflected light passes through the analyzer 216 to produce output light 217. The reflective spatial light modulator 210 also serves as a threshold element so that changing the magnitude of the AC voltage changes the threshold of the reflective spatial light modulator 201.

Consequently, both the transmissive and reflective spatial light modulators of the first aspect of the present invention operate essentially in the same manner.

Hereinafter, the reference examples of the present invention will be described with reference to the drawings.

REFERENCE EXAMPLE 1

Figure 3A:
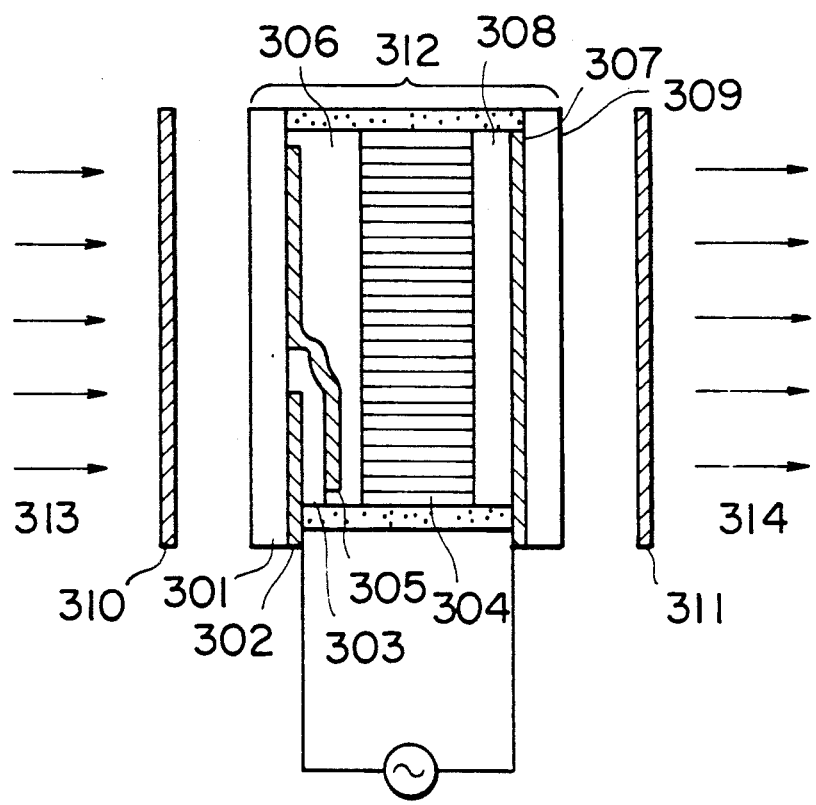
FIG. 3a is a sectional view illustrating another embodiment of the transmissive spatial light modulating element according to the present invention.
Figure 3B:
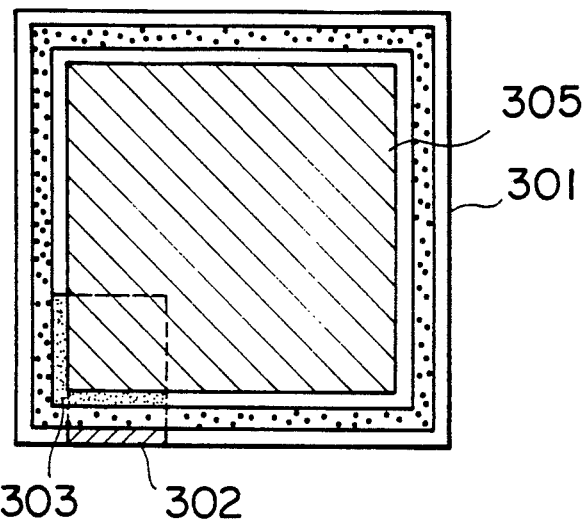

As shown in FIG. 3a, 0.1 μm to 0.5 μm thickness of a film made of ITO was formed on a glass substrate 301 by spattering and an electrode pattern 302 was formed by lithography. Then, by use of plasma CVD process, a photoconductive layer 303 made of a 1 μm to 3 μm thick a-Si:H film was laminated and a grid pattern having 20 μm to 100 μm square mesh-size was formed on the film so as to form a photoconductive layer 303. Then, an electrode pattern 305 made of 0.1 μm to 0.5 μm thickness of a ITO film was formed, for applying a voltage across a liquid crystal 304. The square mesh size of the electrode pattern 305 has 160 μm to 240 μm square. Then, a rubbed orientation film 306 was laminated on the electrode pattern 305. The liquid crystal layer 304 having a thickness of 5 μm to 20 μm was set between an ITO electrode grid pattern 307 having a mesh size of a 160 μm to 240 μm square and a glass substrate 309 laminated thereon with an orientation film 308 thereby to obtain a liquid crystal cell. The transmissive spatial light modulator 312 was then obtained by arranging a polarizer 310 and an analyzer 311 on both sides of the liquid crystal cell as shown in FIG. 3b which is a plan view illustrating the photoconductive layer 303 provided on the glass substrate 301.

Figure 4:
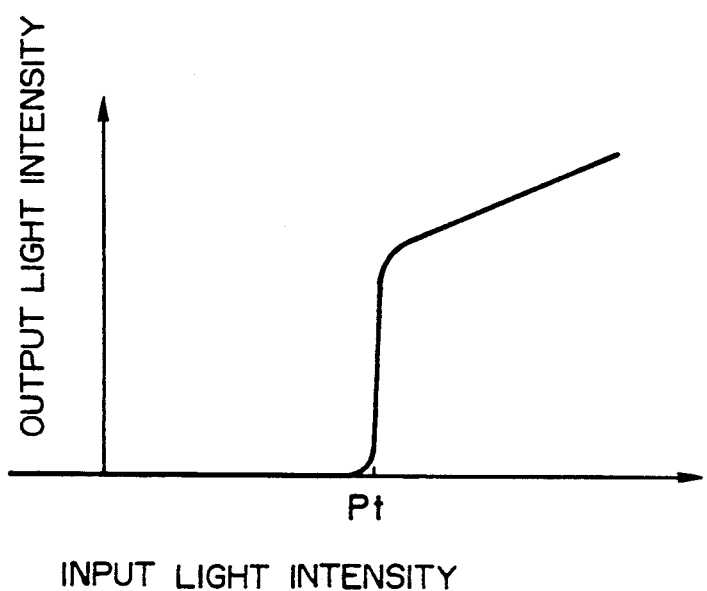
FIG. 4 is a graph illustrating a relationship between the intensity of output light and the intensity of input light.

The AC voltage V was applied to the transmissive spatial light modulator 312 and white light was used as the incident light 313 in order to confirm the operation of the transmissive spatial light modulator 312. The following facts were apparent from this confirmation: the rate of the intensity of the output light 314 to that of the incident light 313 was very as high as 70 to 85% if losses in the intensities of the incident light 313 and output light 314 caused by the polarizer 310 and analyzer 311 were not taken into account. The intensity of the incident light 313 higher than a few μW/cm² caused a rise of the output light 314. In other words, even through the intensity of the incident light 313 was low, the transmissive spatial light modulator 312 sufficiently operated. FIG. 4 shows a variation in the intensity of the output light 314 caused when the intensity of the incident light 313 was increased under a fixed voltage. When the AC voltage V was increased, the threshold $P_t$ of the intensity of the incident light 313, at which the output light 314 rises was reduced.

REFERENCE EXAMPLE 2

Figure 5A:
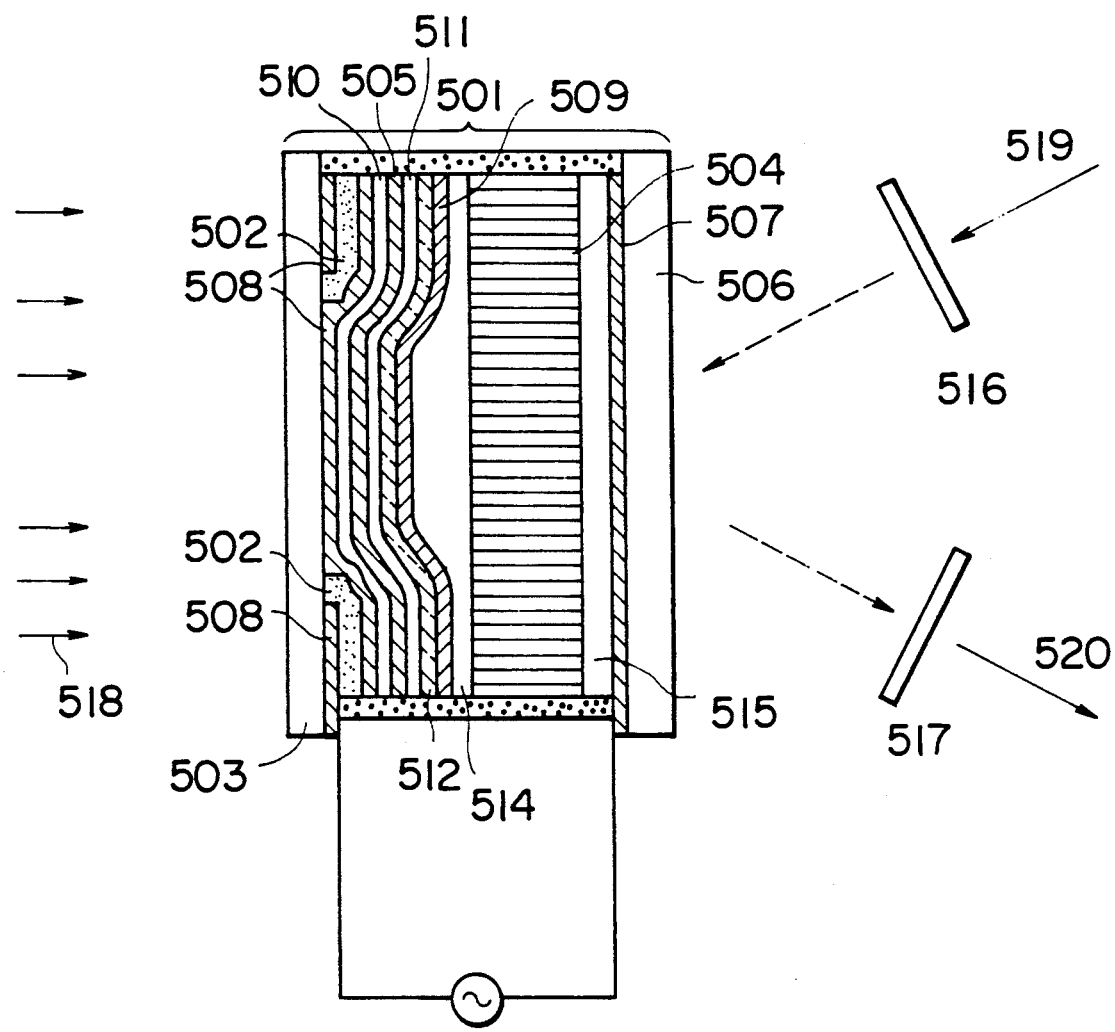
FIG. 5a is a sectional view illustrating another embodiment of the reflective spatial light modulator according to the present invention.
Figure 5B:
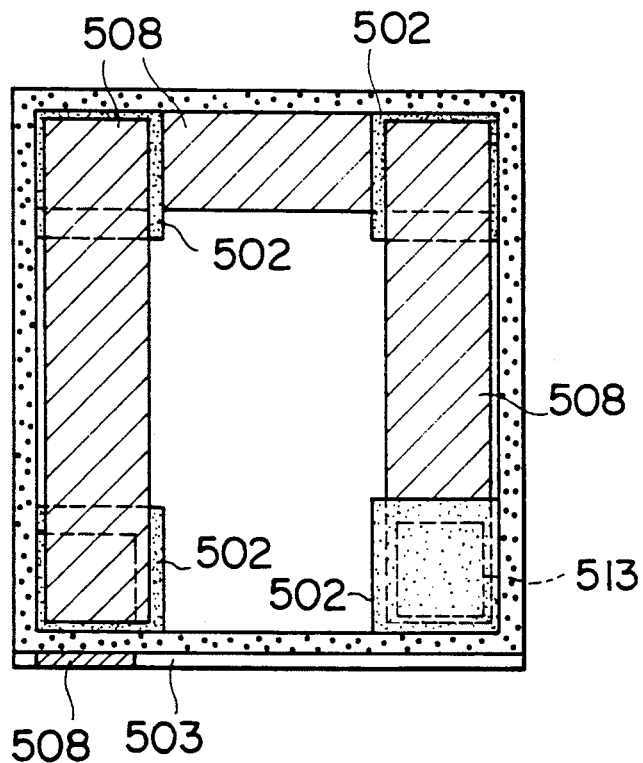

A reflective spatial light modulator 501 as shown in the FIG. 5a was formed. FIG. 5b is a plan view of a glass substrate 503 having a photoconductive layer 502 provided thereon. The reflective spatial light modulator 501 has such a fundamental arrangement in which four photoconductive layers 502 which were connected together in series by a transparent conductive electrode pattern 508 are connected in series to a pair of a conductive electrode 505 provided on a glass substrate 503 and a transparent conductive electrode 507 provided on a glass substrate 506 opposite to the glass substrate 503. The photoconductive layer 502 was formed of 0.5 μm to 2 μm thickness of a film made of a-Si$_{1-x}$C$_x$:H (0<x<0.4). A light reflection layer 509 was formed of 0.5

μm thickness of an Al film. Insulating layers 510, 511 each made of 0.5 μm to 0.8 μm thickness $SiN_x$ or $SiO_x$ film were provided between the conductive electrode 505 and photoconductive layer 502, and between the conductive electrode 505 and the light reflection layer 509, respectively. A light absorption layer 512 made of 0.5 μm thickness of a-$Si_{1-x}Ge_x$:H film (0.4<x<1) was provided between the insulating layer 511 and the light reflection layer 509. The connection between the conductive electrode 505 and photoconductive layer 502 was provided through a through-hole 513 formed in the insulating layer 510. Orientation films 514 and 515 twisted the orientation of the liquid crystal molecules of the liquid crystal layer 504 by 45 degrees in parallel to the direction of the liquid crystal layer 504. The polarization directions of the polarizer 516 and analyzer 517 were orthogonal to each other.

Figure 6:
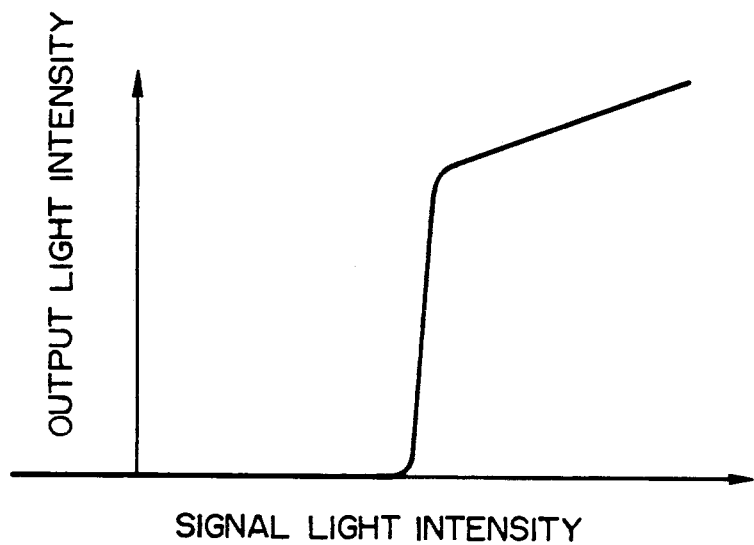
FIG. 6 is a graph illustrating a relationship between the intensity of output light and the intensity of signal light.

In order to examine the operational characteristic of the reflective spatial light modulator 501 by means of reading light 519 emitted from an He-Ne laser or white light source, the AC voltage V was applied to the reflective spatial light modulator 501 while signal light 518 of 350 nm to 600 nm of a wavelength were irradiated upon the four photoconductive layers 502 at the same intensity of light. This examination gave the following facts: if the intensity of the signal light 518 was increased under a fixed voltage, the relationship between the intensities of the signal light 518 and output light 520 had a nonlinear characteristic as shown in FIG. 6. Even through the intensity of the signal light 518 irradiated onto one of the four photoconductive layers 502 differed from the intensity of the signal light 518 irradiated to the others, the relationship between the total intensity of the signal light 518 and the intensity of the output light 520 had the same nonlinear characteristic as that as shown in a FIG. 6.

When the AC voltage V was increased, the intensity of the signal light 518 at which the output light 520 is first observed was reduced.

In addition, even though the number of the photoconductive layers 502 was changed, a similar result was produced.

The reflective spatial light modulator 501 may be also used as an optical logic element. For example, using two the photoconductive layers 502 for simplification, if the AC voltage V is not applied to the liquid crystal layer 504, when light is not incident upon both photoconductive layers 502 simultaneously, the reflective spatial light modulator 501 serves as an AND gate. On the other hand, if the AC voltage V is irradiated to the liquid crystal layer 504, when light is incident upon even one photoconductive layer 502, the reflective spatial light modulator 501 serves as an OR gate. A reflective spatial light modulator having more than three photoconductive layers 504 realizes multiple state logic operation. It is noted that the transmissive spatial light modulator also realizes such multiple state logic operation. Further, in case of two photoconductive layers 502 made of different materials such as a-Si:H and a $Si_{1-x}C_x$:H (0.2<x<0.4), the above-mentioned logic computation can be attained even for two light beams having different wavelengths (for example, shorter than 550 nm and longer than 600 nm). This arrangement is preferable since the alignment between the photoconductive layer 502 and the light source can be facilitated in comparison with the arrangement mentioned above.

REFERENCE EXAMPLE 3

Figure 7A:
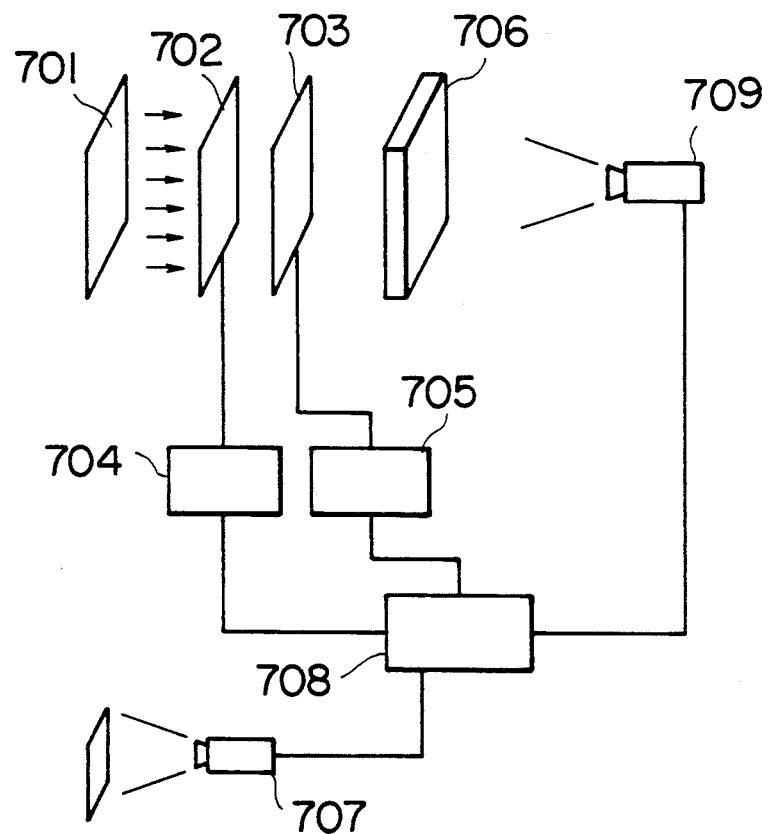
FIG. 7a is a schematic view illustrating one embodiment of a neural network circuit according to the present invention.
Figure 7B:
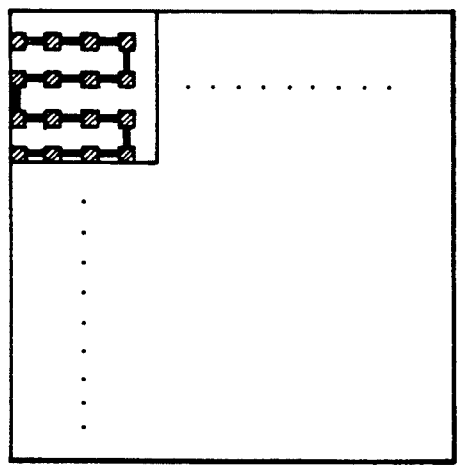
FIG. 7b is a view illustrating a reflective spatial light modulating element array according to the present invention.
Figure 7C:
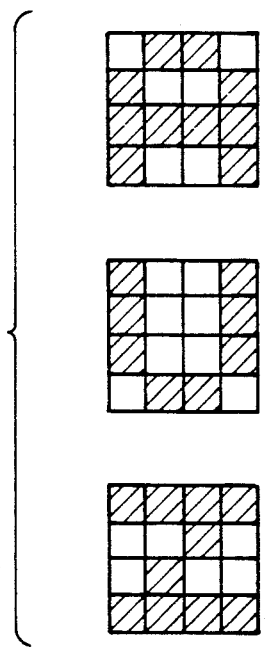
Figure 7D:
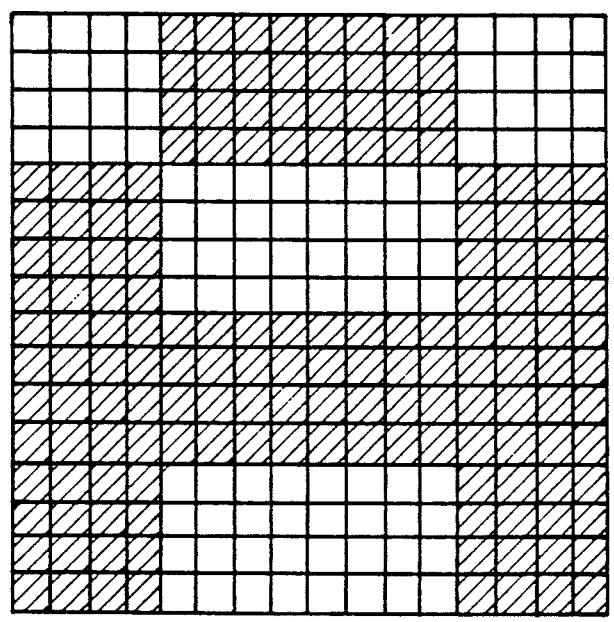
FIG. 7d is a view illustrating an enlarged input pattern.
Figure 7E:
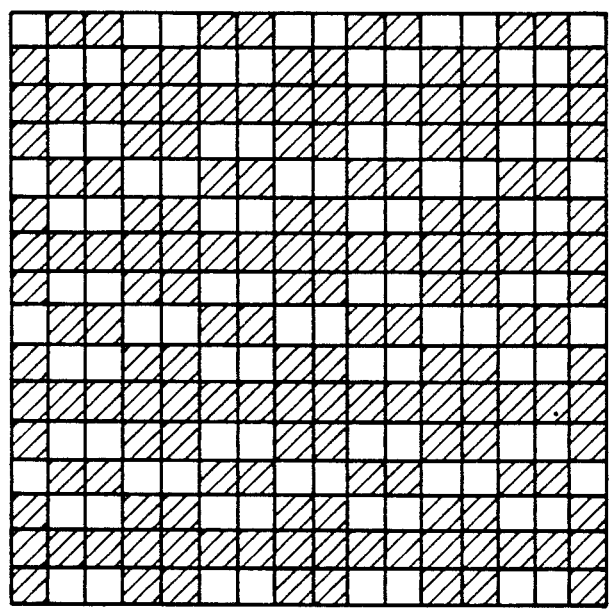
FIG. 7e is a view illustrating multi-images of input patterns.
Figure 7F:
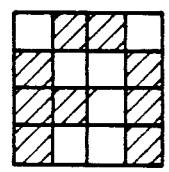
FIG. 7f is a view illustrating an incomplete pattern.

An embodiment of a neural network of the present invention will be hereinafter described with reference to FIG. 7a to 7f. FIG. 7a is a schematic diagram view illustrating the arrangement of the neural network circuit. FIG. 7b is a diagrammatic view illustrating the arrangement of each of the reflective spatial light modulators. FIG. 7c is a view illustrating examples of pattern stored in the neural network circuit of FIG. 7a. FIG. 7d is an enlarged view illustrating the input pattern. FIG. 7e is a view illustrating multi-image of input patterns.

In the network, there are provided in parallel, active matrix type liquid crystal cells (they will be hereinafter referred to as a first AM-LC cell 702 and a second AM-LC cell 703) each having a-Si:H or polycrystal Si transistor array as an active element and a 90-deg.-twist nematic liquid crystal layer, and a light emitting element 701 such as one having light emitting diodes, electroluminescent (i.e., EL) elements or fluorescent lamps and an surface diffusion plate. Each of the first and second AM-LC cells 702 and 703 had 160,000 (=400×400) pixels was driven by a driver 704 or 705. A reflective spatial light modulator 706 similar to the one explained in the second embodiment is arranged in parallel to both first and second AM-LC cells 702 and 703 so as to form the neural network as shown in FIG. 7a. The reflective spatial light modulator 706 comprises 16 photoconductive layers which are arranged in a 4×4 matrix in a plane.

Figure 8:
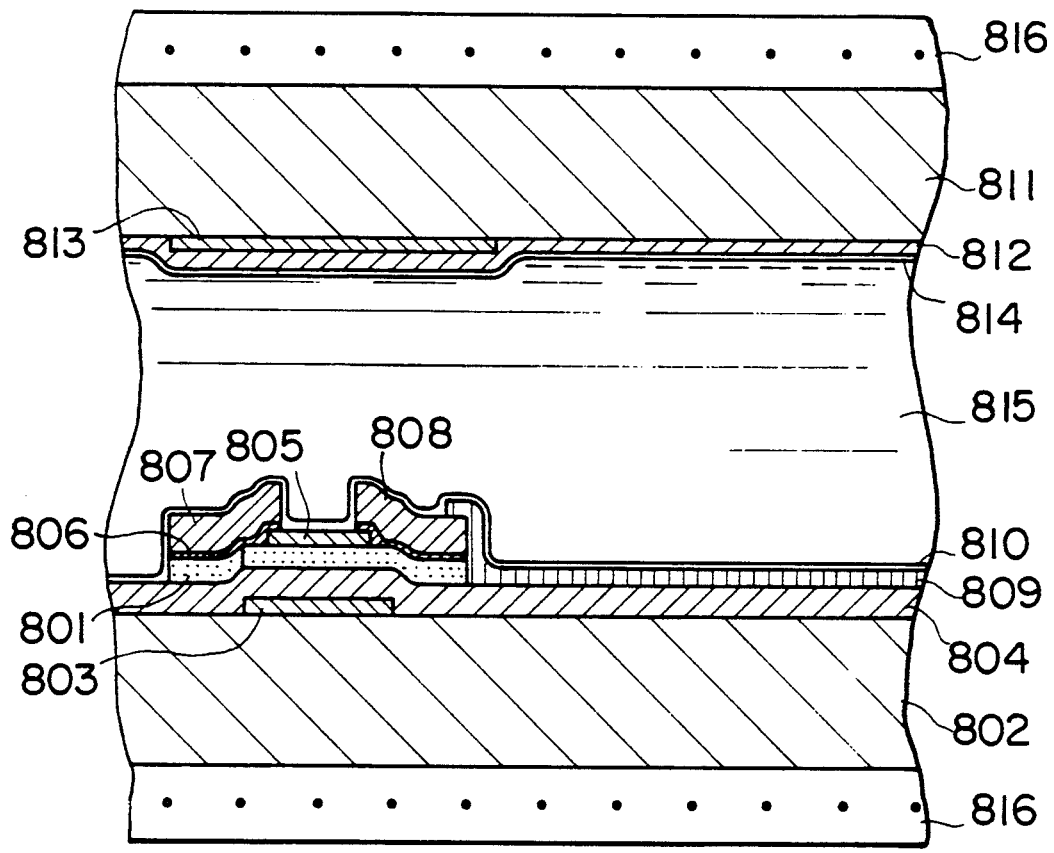
FIG. 8 is a schematic sectional view illustrating an active matrix type liquid crystal cell.

Hereinafter, each of the first and second AM-LC cells 702 and 703 will be described in detail with reference to FIG. 8 which is a schematic sectional view. Each of the first and second AM-LC cells 702 and 703 had such an arrangement that an a-Si:H or polycrystalline thin film transistor or TFT as a semiconductor layer 801 was provided as an active element in the form of matrix on one glass substrate 802. In the formation of the TFT, a gate electrode 803 made of Cr or the like was first formed on the glass substrate 802, and then by use of a plasma CVD process, a gate insulating film 804, the semiconductor layer 801 and a semiconductor protection layer 805 were formed and subjected to patterning. An n-type semiconductor layer 806 was disposed in order to improve the ohmic characteristic of the TFT, then a source electrode 807 and a drain electrode 808 made of Al or the like were concurrently formed, and finally a transparent electrode 809 made of ITO or the like was formed, thereby the TFT was obtained. Then, an orientation film 810 was applied and then subjected to a rubbing process. The other glass substrate 811 was provided thereon with an opposite electrode 812 and a light shield black matrix 813. An orientation film 814 was applied and was subjected to a rubbing process similarly to the orientation film 810. However, the rubbing direction of the orientation film 814 was shifted by about 90 degrees from that of the orientation film 810 provided on the glass substrate 802. Twist nematic liquid crystal 815 was charged between the glass substrates 802 and 811. Polarizers 816 were arranged in front and rear of the glass substrates 802 and 811. In order to improve the performance of each of the first and second AM-LC cells 702 and 703, a storage capacity may be added thereto, and/or a source electrode 807, a drain electrode 808 and a transparent electrode 809 may be made of a one-piece thin film.

Hereinafter, the principle of the operation of a neural network (in this case, associative memory which is one of operations of neural system is exemplified) will be described with reference to FIGS. 7a to 7f. A TV camera 707 picks up an input pattern ($X_1$) in the form of a 4×4(=16) matrix, e.g., the topmost one of the three input patterns shown in FIG. 7c. A computer 708 processed the top input pattern of FIG. 7c to produce a corresponding multi-image pattern ($X_{1L}$) in the form of a 16×16(=256) matrix shown in FIG. 7d on the first AM-LC cell 702 and produce a corresponding enlarged image ($X_{1G}$) in the form of a 16×16(=256) matrix shown in FIG. 7e on the second AM-LC cell 703. The matrix elements of the multi-image patterns ($X_{1L}$); ($X_{1G}$) were arranged so as to correspond to each other one to one. A TV camera 709 picked up a transmitted image of each of the multi-image patterns ($X_{1L}$), ($X_{1G}$) without using the reflective spatial light modulator 706 to produce a memory matrix $M_1$. Similarly, the TV camera 709 produced memory matrices $M_2$ and $M_3$ from the remaining two patterns shown in FIG. 7c. The total of the memory matrices $M_1$, $M_2$ and $M_3$ was determined as a memory pattern $M(=M_1+M_2+M_3)$. Then, the multi-image $X_{1L}$ was displayed on the first AM-LC cell 702 while the memory pattern was displayed on the second AM-LC cell 703. Further focusing was made so as to cause one element of each of the multi-image $X_{1L}$ and memory pattern M to form its image on one cell having one photoconductive layer of the reflective spatial light modulator array 706. As reading light for the reflective spatial modulator 706, Ar laser or He-Ne laser was used. The TV camera 70 picked up from the reflective spatial modulator 706 a reflected image of which has been subjected to the threshold operation, so as to produce an imagination result $Y_1$ in the form of a 4×4 matrix. If the imagination result $Y_1$ was equal to the input pattern $X_1$, a next input pattern $X_1$ was created. On the other hand, when the imagination result $Y_1$ was not equal to the input pattern $X_1$, the memory pattern M was corrected by a learning process. Hereinafter, the learning process will be described with the use of the orthogonal learning method. If $Y_1$ was not equal to the input $X_1$, the computer operated the expression $\alpha(Y_1-X_1) X_1'$, where $\alpha$ represented a constant and t represented a transposition, to produce a new memory pattern M' in addition to the memory pattern M and repeated the imagination process as described above until the imagination result $Y_1$ came to be equal to the input pattern $X_1$. Similarly, the learning was carried out for the remaining patterns with the use of the same memory pattern M. Thus, the input patterns $X_1$ were stored into the memory pattern M. The display of the memory pattern M was made by the gradation of each of the first and second AM-LC cells 702 and 703. When the same imagination process was executed by use of the thus obtained memory pattern M and an incomplete input pattern $X_1$ shown in FIG. 7f, the neural network shown in FIG. 7a created a complete pattern. Further, as to the remaining input patterns $X_1$, complete patterns were obtained from incomplete input patterns. It was confirmed that the neural network employing the reflective spatial light modulator executing the threshold operation could carry out the associative memory resembling in that of the neural system. During learning and imagination controlling the threshold of the reflective spatial light modulator 706 by means of changing the AC voltage V applied thereto, the element improved the convergence of learning and created a complete pattern from an input pattern more incomplete than the incomplete input pattern shown in FIG. 7f.

Consequently, it was apparent that a neural network with a spatial light modulator controlling its threshold improved the function for the operation and the learning. In addition, it was apparent that a similar neural network in which the size of the matrix of the input pattern was increased and the number of the photoconductive layers of the spatial light modulator was correspondingly increased, enables imagination of a larger number of patterns and a more complicated pattern.

REFERENCE EXAMPLE 4

Figure 9A:
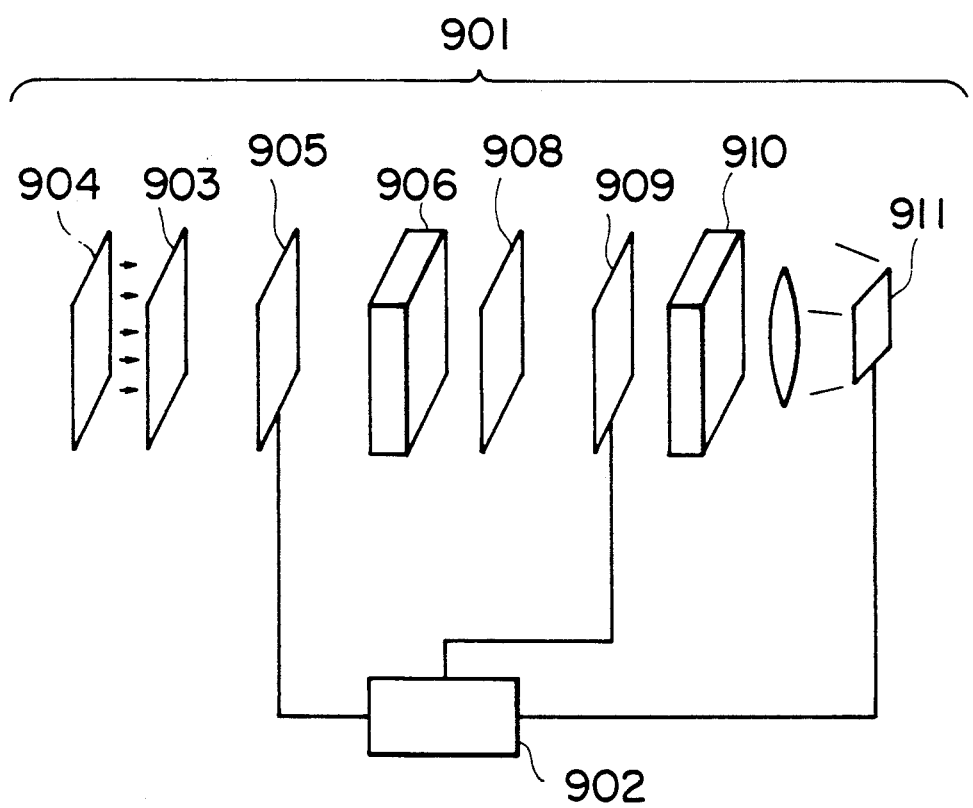
FIG. 9a is a schematic view illustrating one embodiment of a hierarchical neural network circuit according to the present invention.

A hierachical neural network 906 shown in FIG. 9a employing the transmissive spatial light modulator shown in FIGS. 1a to 1c and reflective spatial light modulator shown in FIGS. 5a and 5b was formed.

Figure 9B:
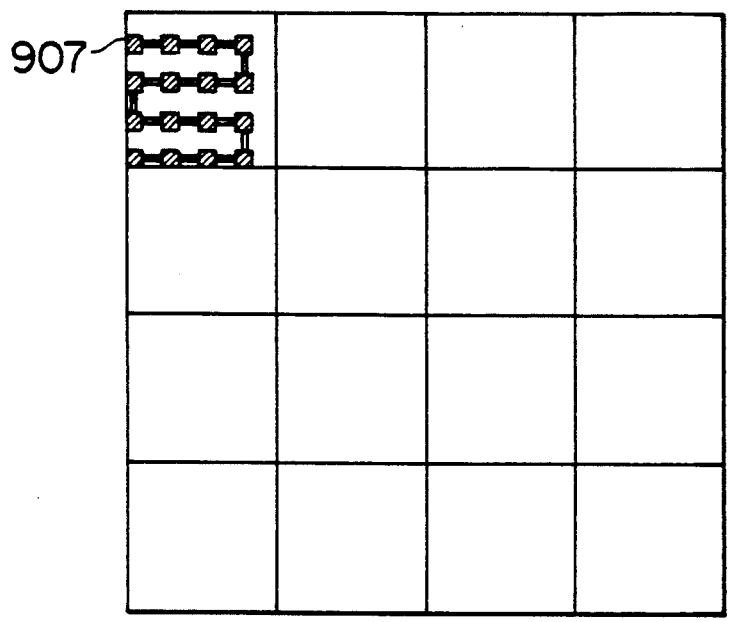
Figure 9C:
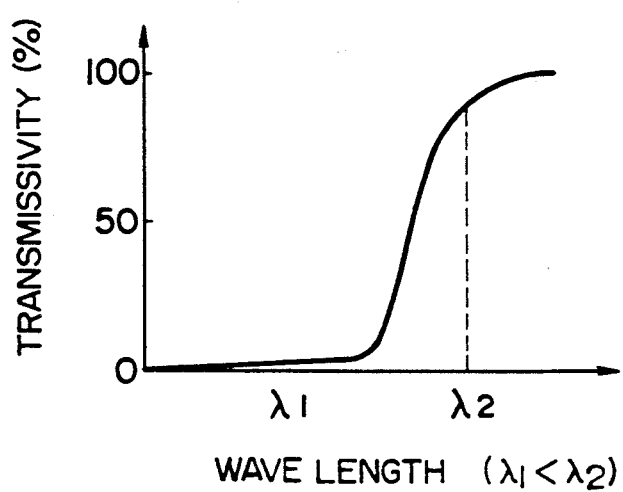
Figure 9D:
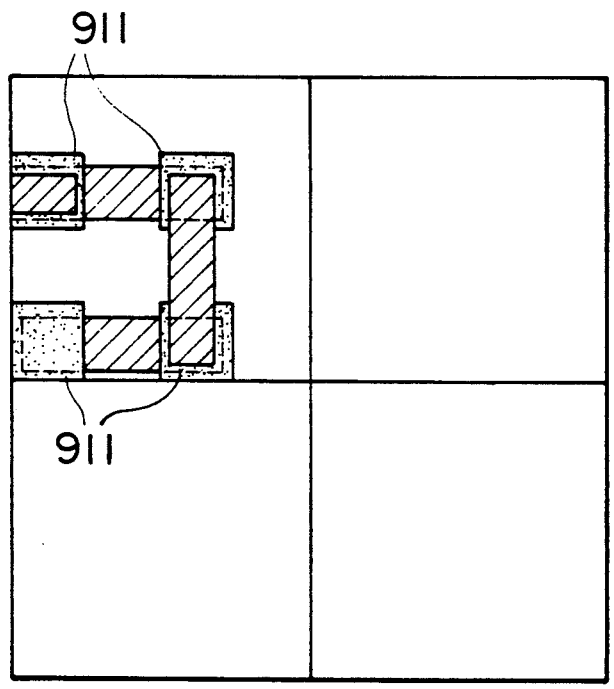
Figure 10:
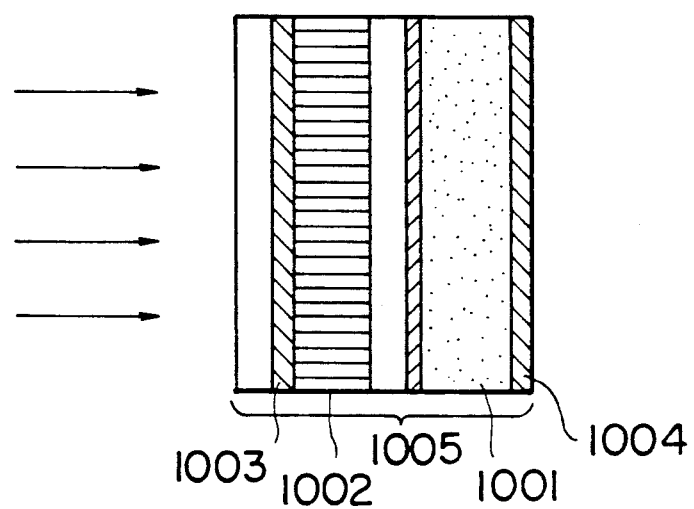
FIG. 10 is a sectional view illustrating a prior-art transmissive spatial light modulator.

First, the arrangement of the hierachical neural network 906 will be described hereinafter. A computer 902 processed an input information (X) in the form of a 4×4 matrix to produce a multi-image ($X_L$) in the form of a 16×16 matrix, similar to that in the Reference Example 3, on a first AM-LC cell 903. The first AM-LC cell 903 was equivalent to a nerve cell of an input layer. A surface light source 904 emitted light having different wavelength components $\lambda_1$ and $\lambda_2$. The light passing through a first AM-LC cell 903 impinged on a second AM-LC cell 905. Two polarizers of the second AM-LC cell 905 employed colour polarizers having parallel polarization directions. FIG. 9c shows the transmission characteristic in a direction normal to the polarization. The second AM-LC cell 905 corresponding to a synapse displayed the strength of the synapse, in the form of a 16×16 matrix by means of the gradation of the second AM-LC cell 905. Thus, the light having the wavelength $\lambda_1$ was modulated by the second AM-LC cell 905. On the other hand, the light having the wavelength $\lambda_2$ passed through the second AM-LC cell 905 irrespective of an operational condition of the liquid crystal layer. Transmitted light from the second AM-LC cell 905 was converged on a first spatial light modulating element array (hereinafter, referred to SLM array) in which 16 transmissive spatial light modulators as shown in FIGS. 1a to 1c are arranged in the form of a 4×4 matrix. As shown in FIG. 9b, 16 photoconductive layers 907 are connected together in series with a corresponding element of the matrix. The light irradiated to the 16 photoconductive layers 907 controls the transmission factor of one element of the matrix. The material of the photoconductive layers 906 mainly absorbs the $\lambda_1$ light, rather than the $\lambda_2$ light. The first SLM array 906 corresponds to nerve cells of an intermediate layer. A colour filter 908 cut off the $\lambda_1$ light component of the light passing through the first SLM array 906 and allowed only the $\lambda_2$ light component thereof to pass therethough. The transmitted light from the colour filter 908 was converged on a third AM-LC cell 909 displaying the strength of synapse in the form of a 4×4 matrix. The transmitted light from the third AM-LC cell 909 was coverged on a second reflective SLM array 910 as shown in FIG. 5. As shown in FIG. 9c, the second SLM array 910 had an arrangement in the form of a 2×2 matrix in which 4 photoconductive layers 911 in each matrix element were connected together in series. Each of the photoconductive layers 911 was made of a material adequately absorbing the $\lambda_2$ light. The second SLM array 910 corresponds to nerve cells of an output layer. A phototransistor array (hereinafter, referred to as a PTA) 912 in the form of a 2×2 matrix received the output light from the second SLM array 910. The computer 902 processed a signal from the PTA 912 to cause the second AM-LC cell 905 and third AM-LC cell 909 both corresponding to the synapse in a feedback type supervised learning method (e.g., back propagation learning error method) to learn. This system had a state in which a hierarchical neural network comprising 16 input layers, 16 intermediate layers and 4 output layers was established.

The hierarchical neural network 901 was caused to learn in order to recognize input informations, e.g., sunshine, fluorescence, incandescence, sodium lamp light and candlelight in response to an output from a photosensor responsive to 16 kinds of single-wavelength light. During learning, the magnitudes of the AC voltages applied to the first SLM array 906 and second SLM array 910 were changed so as to change the thresholds of the first and second SLM arrays 906 and 910. The neural network circuit achieved a 100% recognition rate of learned input informations and a 99% or more recognition rate of unlearned input informations. A case in which the thresholds were learned had the convergence of learning of the neural network 901 at a rate 5 to 10 times as high as that in the case of the unleared thresholds.

Thus, the simple alternating laminations of the transmissive spatial light modulator array made, e.g., of the AM-LC cells and the SLM array can very easily realize the hierarchical neural network if the hierarchical neural network has the photoconductive layers of the SLM array made of materials having forbidden band widths sequentially reduced in the advancing direction of light. On the other hand, even increasing the matrix sizes of the AM-LC cells and SLM array of a hierarchical neural network more than those of the hierarchical neural network 901 of Reference Example 4 produces similar advantages. In addition, increasing the number of pairs of the AM-LC cells and the SLM array so as to increase the layers of the hierarchy can also improve the operation of the hierarchical neural network.

Consequently, the present invention provides a transmissive or reflective spatial light modulating element which can operate in response to very low signal light and in particular, a transmissive spatial light modulator by which a loss in the intensity of transmitted light is low. The present invention also provides a hierarchical neural network having a learning function, threshold operation executing function, very simplified arrangement and high rate convergency of learning.

What is claimed is:

1. A spatial light modulator, comprising:
   a liquid crystal cell including a liquid crystal layer held between two opposite conductive electrodes having surface areas with different magnitudes; and
   a photoconductive layer held between said conductive electrodes and connected in series with said liquid crystal cell;
   wherein said photoconductive layer has a surface area having a magnitude which is less than 50% of a smaller one of the magnitudes of the surface areas of the conductive electrodes between which the liquid crystal layer is held.

2. A spatial light modulator as recited in claim 1, wherein said photoconductive layer comprises a plurality of photoconductive layers.

3. A spatial light modulator as recited in claim 2, wherein the plurality of photoconductive layers are made of materials having different forbidden gap band widths.

4. A spatial light modulator as recited in claim 1, wherein said photoconductive layer includes a depletion layer.

5. A spatial light modulator as recited in claim 1, wherein the liquid crystal layer is made of a ferroelectric liquid crystal.

6. A neural network, comprising:
   a light emitting element; and
   a plurality of spatial light modulators which are arrayed in parallel, and each of which includes a liquid crystal cell with a liquid crystal layer held between two opposite conductive electrodes having surface areas with different magnitudes and a photoconductive layer held between conductive electrodes and connected in series to said liquid crystal cell, the photoconductive layer having a surface area with a magnitude which is less than 50% of a smaller one of the magnitudes of the surface areas of the conductive electrodes between which the liquid crystal layer is held.

7. A neural network as recited in claim 6, wherein the photoconductive layers of the spatial light modulators are made of materials having different forbidden gap band widths.

* * * * *